Aug. 16, 1949.    K. F. BAEHL    2,479,457
CHILD'S PLAY WAGON
Filed Nov. 13, 1947    2 Sheets-Sheet 1

INVENTOR.
KILLIAN F. BAEHL
BY
Kimmel & Crowell
Attys.

Aug. 16, 1949. K. F. BAEHL 2,479,457
CHILD'S PLAY WAGON
Filed Nov. 13, 1947 2 Sheets-Sheet 2

Patented Aug. 16, 1949

2,479,457

UNITED STATES PATENT OFFICE 2,479,457

CHILD'S PLAY WAGON

Killian F. Baehl, Evansville, Ind.

Application November 13, 1947, Serial No. 785,758

3 Claims. (Cl. 280—87.01)

This invention relates to a child's play wagon.

An object of this invention is to provide a wagon frame structure which may be made out of welded together parts which will form a strong but light weight frame.

Another object of this invention is to provide a wagon frame structure wherein the front bolster is fixed to the longitudinal beam and the front wheels are mounted in vertical bearings carried by the front bolster so as to provide a dirigible front wheel assembly. In this manner the wagon may be turned within a short radius, and the front end of the wagon is less liable to tilt than when the front bolster is associated with a fifth wheel.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 2 is a sectional view taken on the line 2—2 of Figure 3.

Figure 3 is a sectional view taken on the line 3—3 of Figure 2.

Figure 1:
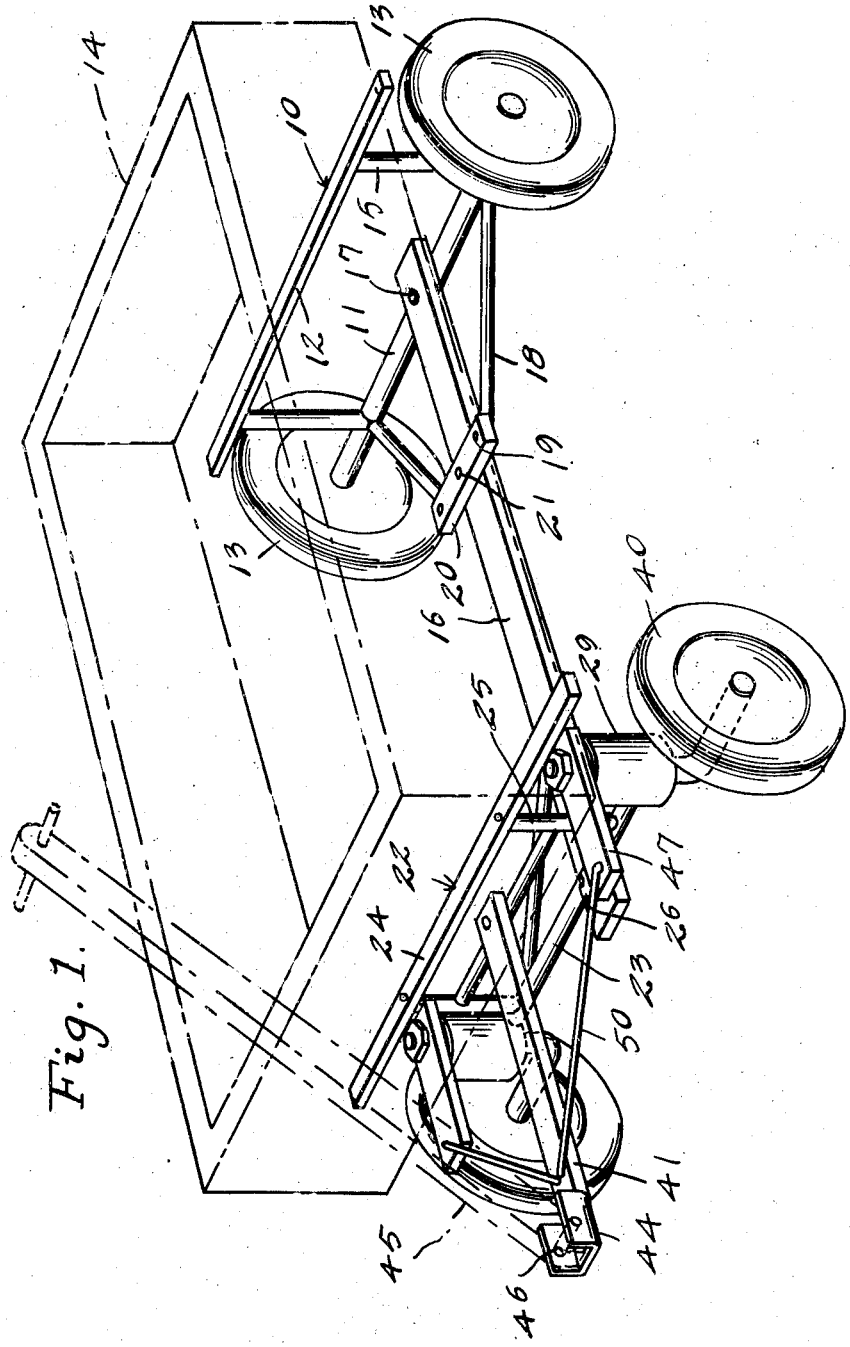
Figure 1 is a perspective view of a wagon constructed according to an embodiment of this invention.

Referring to the drawings, the numeral 10 designates generally a rear bolster for a wagon which includes a shaft or axle 11 having wheels 13 mounted on the outer ends thereof. The bolster 11 also includes an upper horizontal bar 12 to which the rear portion of a body 14 is adapted to be secured. The upper horizontal bar 12 is supported above the axle 11 by means of a pair of upright supporting members 15 which are secured as by welding or the like between the axle 11 and the upright bar 12. A longitudinally extending beam 16 is secured by fastening means 17 to the axle or lower bar 11 and the rear bolster 10 is braced relative to the beam 16 by means of a pair of forwardly convergent bracing bars 18 which are fixed at their rear ends to the axle or lower bar 11 and are fixed as at 19 to a transverse bar 20. The transverse bar 20 in the present instance engages over the upper side of the beam 16 and is secured thereto by fastening means 21.

A front bolster, generally designated as 22, is secured to the front beam 16 and includes a lower horizontal bar 23 and an upper horizontal bar 24. A pair of vertical connecting bars 25 are fixed between the two bars 23 and 24. The front bolster is fixed to the upper side of the beam 16 by fastening means 26 and the front bolster is also braced relative to the beam 16 by means of a pair of rearwardly converging bracing bars 27 which are fixed as by welding or the like to the lower bar 23 and are fixed by fastening means 28 to the upper side of the beam 16. The front bolster is provided at the outer ends thereof with a pair of vertically disposed bearing housings 29 within which upper and lower anti-friction bearings 30 and 31 are mounted.

The housing 29 at its lower end is provided with an inwardly extending flange 32 against which the lower bearing 31 is adapted to engage and a spacer sleeve 33 is interposed between the two bearings 30 and 31. The upper end portion of the bearing housing 29 is provided with an annular groove 34 within which a split annular locking ring 35 engages for locking the upper bearing 30 in the upper portion of the housing 29. A vertically disposed shaft 36 extends through the bearings 30 and 31 being provided at its lower end with a shoulder 37 bearing against the inner race of the lower bearing 31. A nut 38 is threaded on the upper end portion of the shaft 36 to thereby secure the shaft 36 relative to the bearings 30 and 31. The shaft 36 has extending right-angularly from the lower end thereof a spindle 39 on which a wheel 40 is rotatably mounted. A forwardly extending draw-bar 41 is pivotally mounted as at 42 on a horizontally disposed connecting bar 43 which is connected between the uprights 25. The draw-bar 41 has secured to the forward end thereof an inverted U-shaped handle mounting 44 through which the lower end of a handle 45 is pivotally mounted as indicated at 46.

Each shaft 36 has secured to the upper end thereof a forwardly extending bar 47 which engages over a reduced threaded stud 48 formed on the upper end of the shaft 36 and the bar 47 is secured tightly on the upper end of the shaft 36 by means of a nut 49. A tie-bar 50 is connected between the forward end portion of the draw-bar 41 and the bar 47 so that the two front wheels 40 will turn in unison.

In the use of this wagon frame structure a body 14 of suitable configuration is mounted on the bolsters 10 and 22. By reason of the dirigible mounting of the front wheels 40 and the elimination of the conventional fifth wheel, the wagon can be readily turned in a short radius without causing the wagon to tilt as is usually the case with wagons embodying the use of a fifth wheel. This wagon will therefore provide a more safe device for use of children and by reason of its simple construction the wagon can be manufactured at relatively low cost and due to its sturdy construction the wagon will withstand relatively rough usage.

I claim:

1. A play wagon chassis comprising front and rear bolsters, a beam secured between said bolsters, wheels rotatably carried by said rear bolster, vertically disposed tubular housings carried by the opposite ends of said front bolster, upper and lower anti-friction bearings in said housings, a spacer sleeve between said bearings, a vertically disposed shaft in each bearing, a right-angularly disposed spindle extending from the lower end of each shaft, a wheel rotatable on each spindle, a drawbar pivotally secured to said front bolster, a forwardly extending bar fixed to the upper end of each shaft, and a tie bar connecting each of said latter bars to said drawbar.

2. A play wagon chassis comprising front and rear bolsters, a beam secured between said bolsters, bracing means fixed between said bolsters and said beam, wheels rotatably carried by said rear bolster, vertically disposed tubular housings carried by the opposite ends of said front bolster, upper and lower anti-friction bearings in said housings, a spacer sleeve between said bearings, a vertically disposed shaft in each bearing, a right-angularly disposed spindle extending from the lower end of each shaft, a wheel rotatable on each spindle, a drawbar pivotally secured to said front bolster, a forwardly extending bar fixed to the upper end of each shaft, and a tie bar connecting each of said latter bars to said drawbar.

3. A play wagon chassis comprising a rear bolster formed of an axle, an upper bar parallel with said axle, upright bars fixed between said axle and said upper bar, wheels rotatable on the opposite ends of said axle, a front bolster including upper and lower parallel bars, upright bars connected between said upper and lower bars, an intermediate bar fixed between said latter named upright bars, a vertically disposed bearing housing secured to the outer ends of said lower bar, upper and lower anti-friction bearings in said housing, a spacer sleeve between said bearings, a vertically disposed shaft extending through said bearings, a horizontally disposed spindle fixed to the lower end of each shaft, a front wheel on each spindle, a drawbar pivotally secured to said intermediate bar, a forwardly extending bar fixed to the upper end of each shaft, forwardly convergent tie bars fixed between said drawbar and said forwardly extending bars, a beam fixed between said front and rear bolsters, and convergent bracing members fixed between said beam and said bolsters.

KILLIAN F. BAEHL.

REFERENCES CITED

The following references are of record in the file of this patent:

UNITED STATES PATENTS

| Number | Name | Date |
| --- | --- | --- |
| 473,577 | Hurd | Apr. 26, 1892 |
| 666,307 | Farnoff | Jan. 22, 1901 |
| 835,785 | Ferris | Nov. 13, 1906 |
| 1,846,651 | Orelind | Feb. 23, 1932 |